(12) United States Patent
Thielen et al.

(10) Patent No.: US 7,671,132 B1
(45) Date of Patent: Mar. 2, 2010

(54) PNEUMATIC TIRE WITH TREAD

(75) Inventors: Georges Marcel Victor Thielen, Grand Duchy (LU); Frank Schmitz, Bissen (LU); Nicola Costantini, Grand Duchy (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 11 days.

(21) Appl. No.: 12/336,773

(22) Filed: Dec. 17, 2008

(51) Int. Cl.
*C08L 23/04* (2006.01)
*C08L 25/10* (2006.01)

(52) U.S. Cl. .................. 525/191; 525/240; 525/241; 525/242; 524/451

(58) Field of Classification Search .............. 525/191, 525/240, 241, 242; 524/451
See application file for complete search history.

(56) References Cited

U.S. PATENT DOCUMENTS

| | | | |
|---|---|---|---|
| 5,877,249 A | 3/1999 | Lambotte | 524/493 |
| 7,096,903 B2 | 8/2006 | Weydert et al. | 152/209.1 |
| 7,193,004 B2 | 3/2007 | Weydert et al. | 524/424 |
| 7,253,225 B2 | 8/2007 | Labauze et al. | 524/313 |
| 7,411,018 B2 | 8/2008 | Appel et al. | 524/527 |
| 2006/0060285 A1 | 3/2006 | Weydert et al. | 152/905 |
| 2006/0167184 A1 | 7/2006 | Waddell et al. | 525/192 |
| 2007/0179247 A1* | 8/2007 | Sandstrom et al. | 525/191 |
| 2007/0293619 A1 | 12/2007 | Jacoby et al. | 524/493 |

FOREIGN PATENT DOCUMENTS

WO    WO 02/31044 A1    4/2002

OTHER PUBLICATIONS

J. Stehr, Hamburg, Elastomere Und Kunststoffe, Elastomers and Plastics, KGK—Jan./Feb. 2007, pp. 14-19.
Patent Abstracts of Japan, Publication No. JP7292167 dated Nov. 11, 1995, Softening Agent as Admixture for Rubber and Rubber Composition Containing the Same.
Product Data Sheet, Eastman, Eastman Resin 2336 Hydrocarbon Resin (8 pgs).
Product Data Sheet, Lanxess, Buna VSL 2438-2 HM (2 pgs).
Information Product Data Sheet, Lehmann & Voss & Co., LUVOMAXX PAO 60 (1 pg).
G. Thielen, et al., Beitrage Papers, Model Resins Leading to a Controlled Polymer Phase Morphology, presented at International Rubber Conference, Essen Germany, Jun. 24-26, 1991, pp. 263-272.

* cited by examiner

*Primary Examiner*—Robert D. Harlan
(74) *Attorney, Agent, or Firm*—John D. DeLong

(57) ABSTRACT

The present invention is directed to a pneumatic tire comprising a ground contacting tread, the tread comprising a rubber composition comprising from 30 to 70 parts by weight, per 100 parts by weight of s first elastomer (phr) having a glass transition temperature Tg ranging from about −40° C. to about −10° C. and a solubility parameter ranging from about 4.1 $MPa^{1/2}$ to about 4.5 $MPa^{1/2}$;

from 70 to 30 phr of a second elastomer having a Tg ranging from about −105° C. to about −30° C. and a solubility parameter ranging from about 3.7 $MPa^{1/2}$ to about 4.1 $MPa^{1/2}$;

from 1 to 40 phr of a first plasticizer having a solubility parameter ranging from 3.4 $MPa^{1/2}$ to 3.8 $MPa^{1/2}$;

from 1 to 20 phr of a second plasticizer having a solubility parameter ranging from 4.3 $MPa^{1/2}$ to 4.7 $MPa^{1/2}$; and from 30 to 150 phr of silica.

10 Claims, 6 Drawing Sheets

PNEUMATIC TIRE WITH TREAD

BACKGROUND OF THE INVENTION

It is highly desirable for tires to have good wet braking performance and good braking performance on snow and ice. It has traditionally been very difficult to improve simultaneously a tire's braking characteristics on wet surfaces and snow and ice surfaces. This is because a good wet braking tread formulation needs to provide a high energy dissipation at low temperatures between about −20° C. and about 0° C. at a frequency of 10 Hz. Such a high energy dissipation is related to a stiffening of the rubber tread at temperatures between −10° C. and −40° C. at 10 Hz, which negatively impacts braking on snow and ice.

It would therefore be desirable to have a rubber composition for tires wherein the wet braking performance and braking on ice and snow are simultaneously improved.

SUMMARY OF THE INVENTION

In order to better decouple snow and ice performance versus wet performance, the present invention involves preferential distribution of low Tg plasticizers and high Tg resins in a heterogeneous blend of elastomers. Such a blend of elastomers is applicable in both winter and all season tires.

The present invention is directed to a pneumatic tire comprising a ground contacting tread, the tread comprising a rubber composition comprising from 30 to 70 parts by weight, per 100 parts by weight of s first elastomer (phr) having a glass transition temperature Tg ranging from about −40° C. to about −10° C. and a solubility parameter ranging from about 4.1 MPa$^{1/2}$ to about 4.5 MPa$^{1/2}$;

from 70 to 30 phr of a second elastomer having a Tg ranging from about −105° C. to about −30° C. and a solubility parameter ranging from about 3.7 MPa$^{1/2}$ to about 4.1 MPa$^{1/2}$;

from 1 to 40 phr of a first plasticizer having a solubility parameter ranging from 3.4 MPa$^{1/2}$ to 3.8 MPa$^{1/2}$;

from 1 to 20 phr of a second plasticizer having a solubility parameter ranging from 4.3 MPa$^{1/2}$ to 4.7 MPa$^{1/2}$; and from 30 to 150 phr of silica.

The present invention is further directed to a pneumatic tire comprising a ground contacting tread, the tread comprising a rubber composition comprising from 30 to 70 parts by weight, per 100 parts by weight of elastomers (phr), being styrene-butadiene rubbers having a bound styrene of at least 35 percent by weight;

from 30 to 70 phr of rubbers selected from polybutadiene rubber and polyisoprene rubber;

from 1 to 40 phr of a polyalphaolefin having a glass transition temperature Tg below −60° C.

from 1 to 20 phr of a resin derived from styrene and alphamethylstyrene having a glass transition temperature Tg ranging from 20° C. to 100° C.; and from 30 to 150 phr of silica.

DETAILED DESCRIPTION OF THE INVENTION

Figure 1:
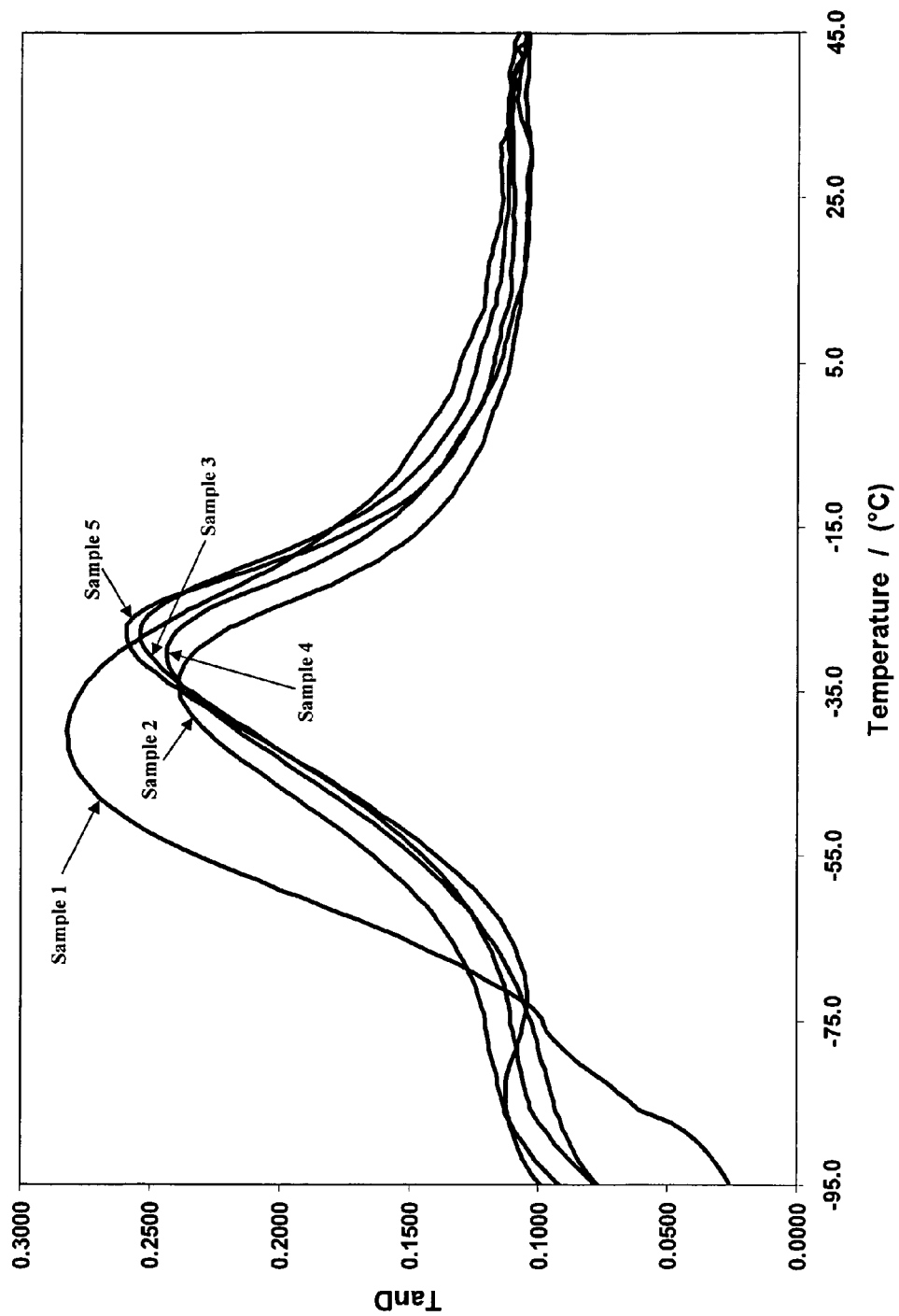
FIG. 1 shows a graph of tangent delta versus temperature for various heterogeneous rubber compounds.

There is disclosed a pneumatic tire comprising a ground contacting tread, the tread comprising a rubber composition comprising from 30 to 70 parts by weight, per 100 parts by weight of s first elastomer (phr) having a glass transition temperature Tg ranging from about −40° C. to about −10° C. and a solubility parameter ranging from about 4.1 MPa$^{1/2}$ to about 4.5 MPa$^{1/2}$;

from 70 to 30 phr of a second elastomer having a Tg ranging from about −105° C. to about −30° C. and a solubility parameter ranging from about 3.7 MPa$^{1/2}$ to about 4.1 MPa$^{1/2}$;

from 1 to 40 phr of a first plasticizer having a solubility parameter ranging from 3.4 MPa$^{1/2}$ to 3.8 MPa$^{1/2}$;

from 1 to 20 phr of a second plasticizer having a solubility parameter ranging from 4.3 MPa$^{1/2}$ to 4.7 MPa$^{1/2}$; and from 30 to 150 phr of silica.

There is further disclosed a pneumatic tire comprising a ground contacting tread, the tread comprising a rubber composition comprising from 30 to 70 parts by weight, per 100 parts by weight of elastomers (phr), being styrene-butadiene rubbers having a bound styrene of at least 35 percent by weight;

from 30 to 70 phr of rubbers selected from polybutadiene rubber and polyisoprene rubber;

from 1 to 40 phr of a polyalphaolefin having a glass transition temperature Tg below −60° C.

from 1 to 20 phr of a resin derived from styrene or alphamethylstyrene having a glass transition temperature Tg ranging from 20° C. to 100° C.; and from 30 to 150 phr of silica.

The rubber composition includes rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

In one embodiment, the rubber composition includes at least two diene based rubbers. In one embodiment, the rubber composition includes emulsion and/or solution polymerization derived styrene/butadiene rubbers, and at least one rubber selected from polybutadiene rubber and polyisoprene rubber.

The rubber composition includes first and second elastomers. In one embodiment, the first and second elastomers are characterized by their glass transition temperature, Tg, and their solubility parameter, δ.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The solubility parameter, δ, is defined as the square root of the cohesive energy density and may be determined as disclosed by Hildebrand and Scott, The Solubility of Non-electrolytes, Dover, N.Y., 1964. The δ-parameters specified here are calculated via an incremental method based on Hoy molar attraction constants (Polymer Handbook, Ed. Brandrup, Immergut, Grulke, Fourth Edition (1999), Volume 2, page VII/675-688).

In one embodiment, the first elastomer has a Tg ranging from about −40° C. to about −10° C. and a solubility parameter δ ranging from about $4.1$ $MPa^{1/2}$ to about $4.5$ $MPa^{1/2}$. In one embodiment, the first elastomer is a styrene-butadiene rubber having a bound styrene content of at least 36 percent by weight.

In one embodiment, the first elastomer is an emulsion polymerization derived styrene/butadiene (E-SBR) having a relatively conventional styrene content of greater than 36 percent bound styrene. By emulsion polymerization prepared E-SBR, it is meant that styrene and 1,3-butadiene are copolymerized as an aqueous emulsion. Such are well known to those skilled in such art.

In one embodiment, the first elastomer is a solution polymerized styrene butadiene rubber. The solution polymerization prepared styrene-butadiene rubber (S-SBR) has a bound styrene content of greater than 36 percent. Suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous or batch polymerization techniques. In the case of continuous polymerization, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

In one embodiment, the second elastomer has a Tg ranging from about −105° C. to about −30° C. (preferably about −105° C. to about −60° C.) and a solubility parameter ranging from about $3.7$ $MPa^{1/2}$ to $4.1$ $MPa^{1/2}$. In one embodiment, the second elastomer is at least one of a polybutadiene rubber and a polyisoprene rubber.

In one embodiment the second elastomer is a cis 1,4-polybutadiene rubber (BR). Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from about −95° C. to about −105° C. Suitable polybutadiene rubbers are available commercially, such as Budene® 1207 from Goodyear and the like.

In one embodiment, the second elastomer is a synthetic or natural polyisoprene rubber.

In one embodiment, the second elastomer is an anionically polymerized polybutadiene rubber with a vinyl content ranging up to 80%.

The rubber composition includes first and second plasticizers. In one embodiment, the first and second plasticizers are characterized by their solubility parameter, δ.

In one embodiment, the first plasticizer has a solubility parameter δ ranging from $3.4$ $MPa^{1/2}$ to $3.8$ $MPa^{1/2}$.

In one embodiment, the first plasticizer is a polyalphaolefin. Suitable polyalphaolefins include polymers of butane, pentene, hexane, heptene, octane, nonene, decene, undodecene, and dodecene. In one embodiment, the polyalphaolefin has a Tg below −60° C. In one embodiment, the polyalphaolefin is poly(1-decene). Suitable polyalphaolefin is available commercially from Lehmann&Voss&Co. as Luvomaxx® PAO 60 with a Tg of −86° C. and a solubility parameter δ of $3.66$ $MPa^{1/2}$.

In one embodiment, the rubber composition includes polyalphaolefin in an amount ranging from 1 to 40 phr. In one embodiment, the rubber composition includes polyalphaolefin in an amount ranging from 10 to 30 phr. In one embodiment, the rubber composition includes polyalphaolefin in an amount ranging from 15 to 25 phr.

In one embodiment, the second plasticizer has a solubility parameter ranging from $4.3$ $MPa^{1/2}$ to $4.7$ $MPa^{1/2}$.

In one embodiment, the second plasticizer is resin derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin with a rubber blend which contains the presence of the styrene-butadiene elastomer is considered herein to be beneficial because of observed viscoelastic properties of the tread rubber composition such as complex and storage modulus, loss modulus tan.delta and loss compliance at different temperature/frequency/strain as hereinafter generally described.

The properties of complex and storage modulus, loss modulus, tan.delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

Suitable styrene/alphamethylstyrene resin is available commercially as Resin 2336 from Eastman with a Tg of 38° C. and a solubility parameter δ of 4.45 MPa$^{1/2}$.

In one embodiment, the rubber composition includes the styrene/alphamethylstyrene resin in an amount ranging from 1 to 20 phr. In one embodiment, the rubber composition includes the styrene/alphamethylstyrene resin in an amount ranging from 5 to 15 phr.

In one aspect, the use of suitable first and second elastomers, or ESBR and/or SSBR and suitable polyisoprene or polybutadiene of the specified composition, may result in a rubber composition having at least two elastomer phases.

More specifically, between 70 and 30 phr of the elastomers may have a Tg lower than −60° C., namely the second elastomer, and between 30 and 70 phr of the elastomers may have a Tg of higher than −40° C., namely the first elastomer.

In this manner, it is considered herein that the relatively low Tg second elastomer is relatively viscoelastically incompatible with the relatively high Tg first elastomer as evidenced by their individual tan delta peaks on a graphical presentation, or plot, of tan delta versus temperature cured of the rubber composition within a temperature range of about −120° C. to about 10° C. Such a plot showing individual tan delta peaks is indicative of a heterogeneous composition of the viscoelastically incompatible first and second elastomers.

Accordingly, the first and second elastomers of the rubber composition may be present in at least two phases, comprised of a first elastomer phase and an additional second elastomer phase.

In particular, a graphical plot of Tan delta versus temperature curve within a broad range of about −100° C. to about 10° C. for the rubber composition of this invention may yield two peaks in the curve with one peak having its apex within a relatively low temperature range of about −105° C. to about −60° C. and a second peak with its apex within a higher temperature range of about −40° C. to about −10° C.

Thus, one indication of the elastomer incompatibilities is the presence of the dual Tan delta peaks for the elastomer composition. The Tan delta values, with the included peaks in their curves, can be determined by dynamic mechanical testing of the cured compound by procedures well known to those skilled in such art.

Thus, the cured compounded rubber composition may exhibit at least two Tan delta peaks within the aforesaid temperature range. For the cured compounded rubber, it is considered herein that a combination of the Tan delta peak, at the lower temperature (e.g., about −105° C. to about −60° C.) for the low Tg second elastomer (e.g., polybutadiene or polyisoprene), may suggest a promotion of improved resistance to abrasion property (i.e., improved treadwear for a tire) and snow and ice braking and traction performance together with the second Tan delta peak, at the higher temperature (e.g., about −40° C. to about −10° C.) represented by the high Tg first elastomer (e.g., the SBR), may suggest a promotion of higher hysteresis at temperatures within a range of about −30° C. to about 0° C. (i.e., higher tire tread traction), all of which is predictive of a better balance of such abrasion resistance and winter performance with traction and braking properties on wet roads particularly for a tire tread, than a cured rubber composition exhibiting only a single Tan delta peak within the aforesaid temperature range of −100° C. to 10° C.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 30 to about 150 phr of silica. In another embodiment, from 60 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

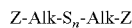

in which Z is selected from the group consisting of

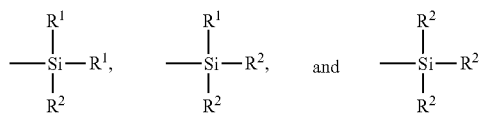

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

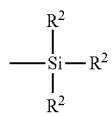

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl]thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

In this example, the effect of replacing process oil with first and second plasticizers in a heterogeneous rubber composition including first and second elastomers is illustrated. Rubber compositions containing diene based elastomers, fillers, process aids, antidegradants, and curatives were prepared following the recipes shown in Table 1 with all amounts in phr.

Sample 1 represented a comparative example and utilitized a homogeneous blend of a medium styrene SBR as first elastomer and cis-polybutadiene as second elastomer. Samples 2-5 utilized a heterogeneous blend of a combination of a high styrene ESBR and high styrene SSBR as first elastomer and cis-polybutadiene as second elastomer.

The rubber compounds were mixed using a Farrel Pomini 1100 ml chamber applying two non-productive mix stages discharged at 160° C. after 2 minutes plateau.

The samples were tested for viscoelastic properties using a Metravib SMD 2000. The temperature sweeps were recorded in shear mode at an amplitude of 0.1%.

Figure 3:
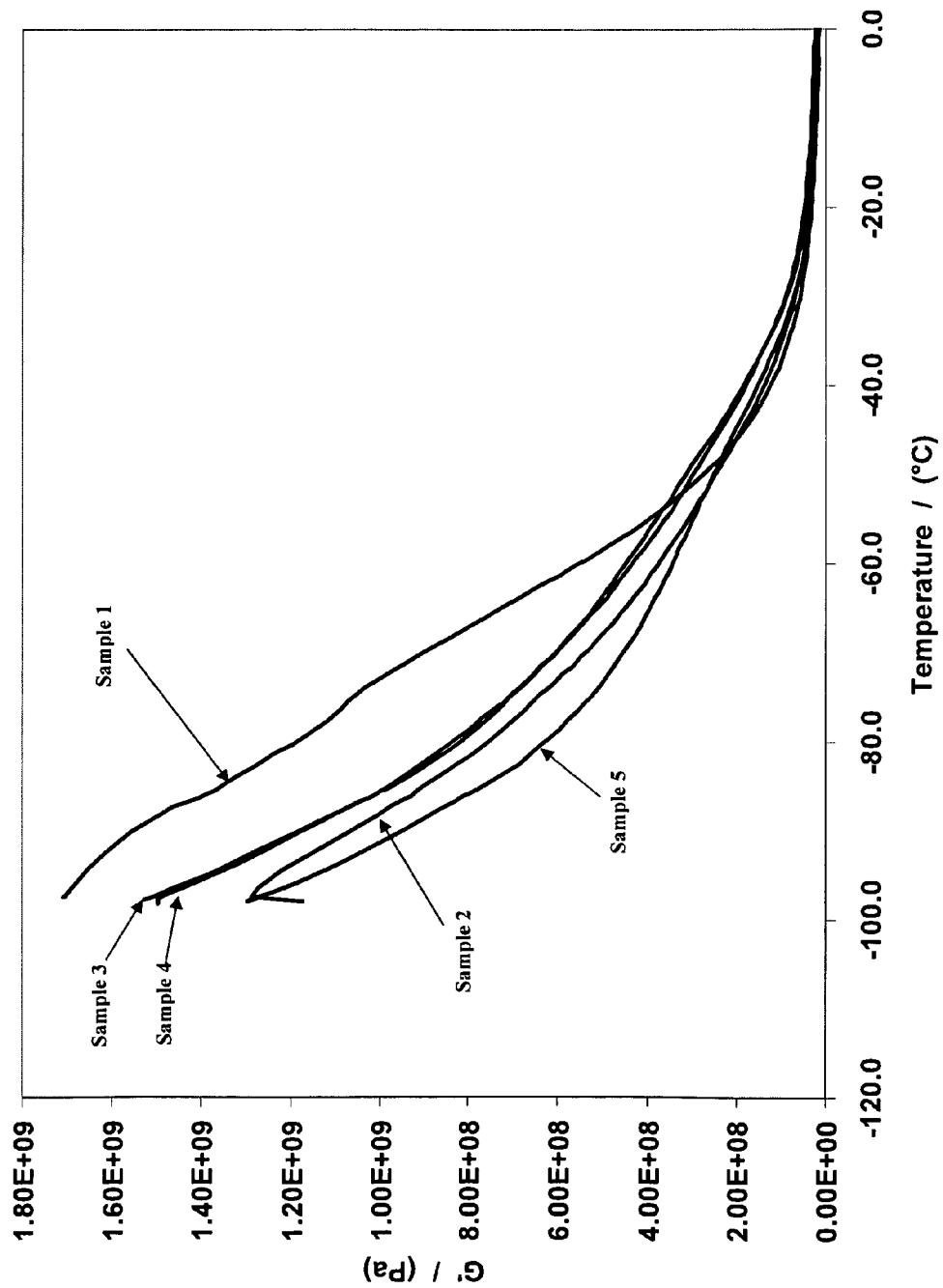
FIG. 3 shows a graph of storage modulus versus temperature for various heterogeneous rubber compounds.

The SMD 2000 test results shown in FIGS. 1, 3 and 3 are reported as tan delta data obtained for a temperature sweep in a dynamic shear mode at a frequency of 1 hertz and at an angle of 0.00583 rad.

TABLE 1

| Sample No. | 1 | 2 | 3 | 4 | 5 |
|---|---|---|---|---|---|
| First Non-Productive Mix Stage | | | | | |
| Polybutadiene, cis[1] | 45 | 60 | 60 | 60 | 60 |
| ESBR, high styrene[2] | 0 | 27.51 | 27.51 | 27.51 | 27.51 |
| SSBR, med styrene[3] | 75.62 | 0 | 0 | 0 | 0 |
| SSBR, high styrene[4] | 0 | 27.51 | 27.51 | 27.51 | 27.51 |
| Polyalphaolefin[5] | 0 | 0 | 0 | 0 | 16.38 |
| Resin[6] | 0 | 0 | 10 | 10 | 10 |
| antidegradant | 2.5 | 2.5 | 2.5 | 2.5 | 2.5 |
| TDAE oil | 19.375 | 23.38 | 16.38 | 0 | 0 |
| Palm oil | 0 | 0 | 0 | 16.38 | 0 |
| stearic acid | 3 | 3 | 3 | 3 | 3 |
| silane | 6.56 | 6.56 | 6.56 | 6.56 | 6.56 |
| silica | 105 | 105 | 105 | 105 | 105 |
| Second Non-Productive Mix Stage | | | | | |
| carbon black | 5 | 5 | 5 | 5 | 5 |
| waxes | 1.5 | 1.5 | 1.5 | 1.5 | 1.5 |
| Productive Mix Stage | | | | | |
| antidegradant | 0.5 | 0.5 | 0.5 | 0.5 | 0.5 |
| zinc oxide | 2.5 | 2.5 | 2.5 | 2.5 | 2.5 |
| sulfur | 1.4 | 1.4 | 1.4 | 1.4 | 1.4 |
| accelerators | 3.9 | 3.9 | 3.9 | 3.9 | 3.9 |

Figure 2:
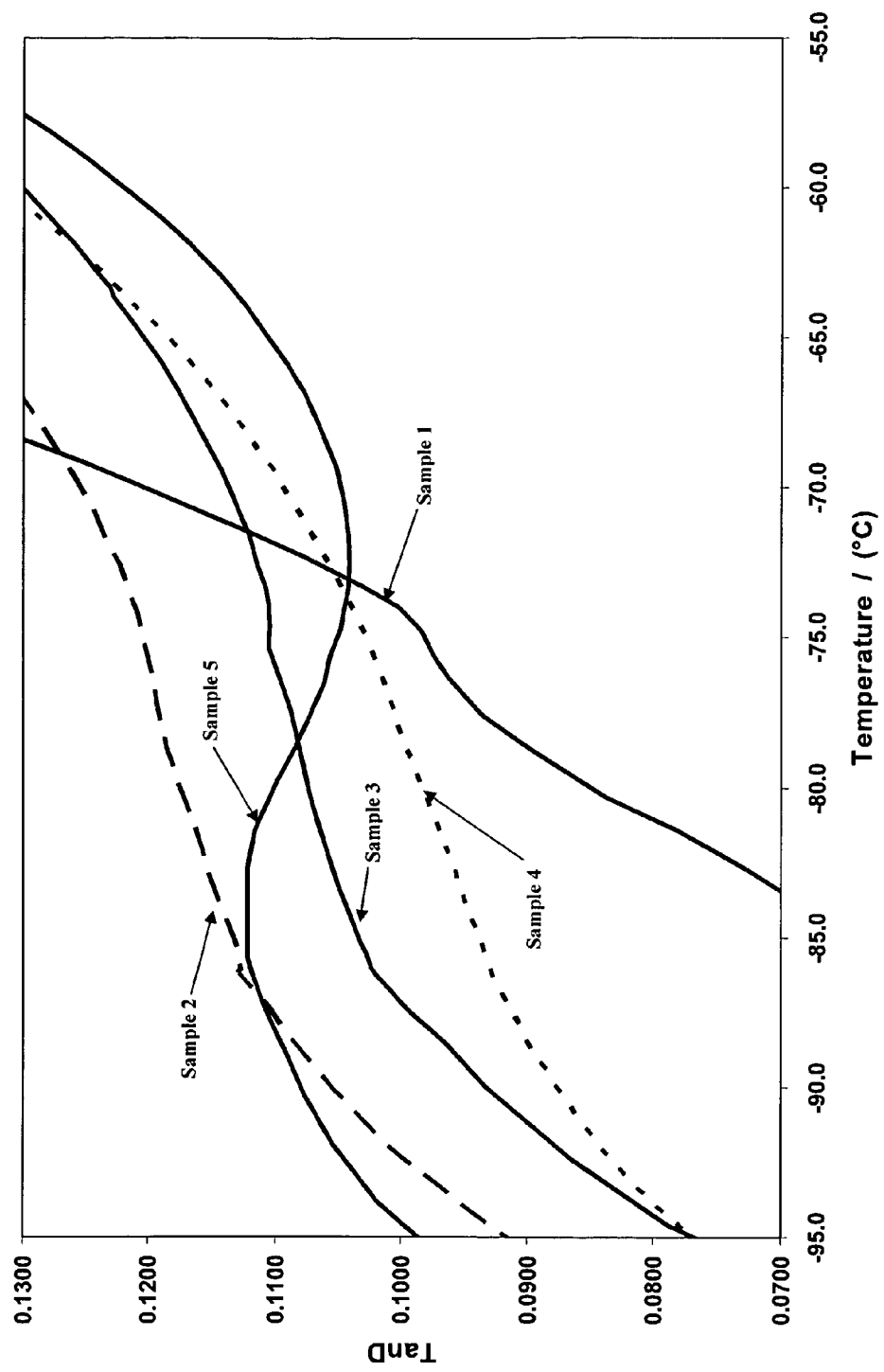
FIG. 2 shows an expanded view of FIG. 1 in a low temperature range.

[1]Polybutadiene with Tg = −104° C., as Budene 1207 from The Goodyear Tire & Rubber Co.
[2]Emulsion polymerized styrene butadiene rubber with 40 percent by weight styrene and Tg = −36° C., extended with 37.5 phr TDAE oil.
[3]Solution polymerized styrene butadiene rubber with 25 percent by weight styrene, 47 percent by weight vinyl and Tg = −25° C., extended with 37.5 phr TDAE oil.
[4]Solution polymerized styrene butadiene rubber with 40 percent by weight styrene, 24 percent by weight vinyl and Tg = −28° C., extended with 37.5 phr TDAE oil.
[5]Hydrated poly-(1-decene), reportedly with kinematic viscosity at 40 C. of 30 mm$^2$/s and solidification point of −63 C., as Luxomaxx ® PAO 60 from Lehmann&Voss&Co.
[6]Styrene/alphamethylstyrene resin, as Resin 2336 from Eastman Chemical The effect of adding first and second plasticizers to a heterogeneous rubber composition containing first and second elastomers is illustrated in FIG. 1 and FIG. 2. Comparative Sample 1 illustrates the viscoelastic behavior of a homogenous elastomer blend with TDAE process oil, with a single broad tan delta peak located between the Tg for the two elastomers. Control Sample 2 illustrates the behavior of a heterogeneous elastomer blend with TDAE oil, with a tan delta peak centered at about −35° C. near the Tg for the first elastomers and an indistinct peak centered at about −80 to −90° C. near the Tg for second elastomer. Such an indistinct peak indicates approximately even distribution of the TDAE oil in the heterogenous blend. Sample 3 with a partial replacement of TDAE with styrene/alphamethyl styrene resin shows a slight shift of the tan delta peak −35° C. to high temperature, due to the higher Tg of the resin. The lower temperature peak centered at about −80 to −90° C. for Sample 3 is indistinct, again indicating an approximately even distribution of styrene/alphamethyl styrene resin and TDAE oil. Sample 4, where the majority of the TDAE oil has been replaced with palm oil, shows a similar behavior to Sample 3. Sample 5, where the majority of the TDAE oil has been replaced with polyalphaolefin, shows a distinct peak centered at about −85° C., along with the higher temperature peak. Such behavior indicates a surprising and unexpected enrichment of polyalphaolefin in the second elastomer, polybutadiene phase along with the enrichment of styrene-alphamethylstyrene resin in the higher Tg styrene-butadiene rubber phase.

Example 2

In this example, the effect of replacing process oil with first and second plasticizers in a homogeneous rubber composition including first and second elastomers is illustrated. Rubber compositions containing diene based elastomers, fillers, process aids, antidegradants, and curatives were prepared following the recipes shown in Table 2 with all amounts in phr.

Sample 1 from Example 1 represented a comparative example and utilitized a homogeneous blend of a medium styrene SBR as first elastomer and cis-polybutadiene as second elastomer. Samples 6 through 9 utilized a homogeneous blend of high styrene SSBR as first elastomer and cis-polybutadiene as second elastomer with a medium styrene SSBR included as a viscoelastic compatibilizer between the first elastomer and second elastomer.

Samples were mixed and tested for various properties as in Example 1. Viscoelastic temperature response as measure by SMD 2000 are shown in FIG. 4.

TABLE 2

| Sample No. | 1 | 6 | 7 | 8 | 9 |
|---|---|---|---|---|---|
| First Non-Productive Mix Stage | | | | | |
| Polybutadiene, cis[1] | 45 | 50 | 50 | 50 | 50 |
| SSBR, med styrene[3] | 75.62 | 34.4 | 34.4 | 34.4 | 34.4 |
| SSBR, high styrene[4] | 0 | 34.4 | 34.4 | 34.4 | 34.4 |
| Polyalphaolefin[5] | 0 | 0 | 0 | 0 | 12.38 |
| Resin[6] | 0 | 0 | 10 | 10 | 10 |
| Antidegradant | 2.5 | 2.5 | 2.5 | 2.5 | 2.5 |
| TDAE Oil | 19.375 | 19.375 | 0 | 12.38 | 0 |
| Palm Oil | 0 | 0 | 12.38 | 0 | 0 |
| Stearic Acid | 3 | 3 | 3 | 3 | 3 |
| Silane | 6.56 | 6.56 | 6.56 | 6.56 | 6.56 |
| Silica | 105 | 105 | 105 | 105 | 105 |
| Second Non-Productive Mix Stage | | | | | |
| Carbon Black | 5 | 5 | 5 | 5 | 5 |
| Waxes | 1.5 | 1.5 | 1.5 | 1.5 | 1.5 |
| Productive Mix Stage | | | | | |
| Antidegradant | 0.5 | 0.5 | 0.5 | 0.5 | 0.5 |
| Zinc Oxide | 2.5 | 2.5 | 2.5 | 2.5 | 2.5 |
| Sulfur | 1.4 | 1.4 | 1.4 | 1.4 | 1.4 |
| Accelerators | 3.9 | 3.9 | 3.9 | 3.9 | 3.9 |

Figure 4:
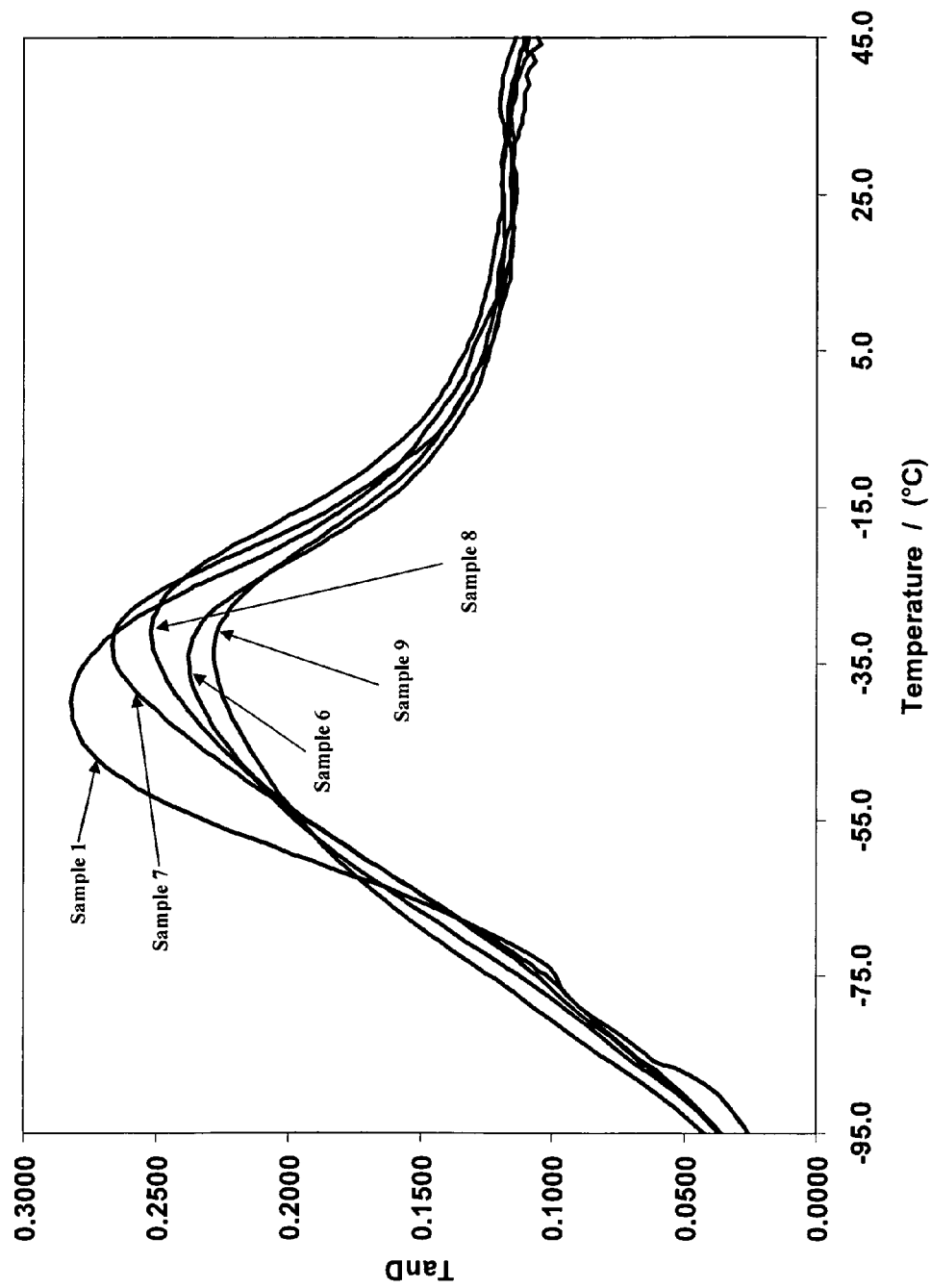
FIG. 4 shows a graph of tangent delta versus temperature for various heterogeneous rubber compounds.

[1]Polybutadiene with Tg = −104° C., as Budene 1207 from The Goodyear Tire & Rubber Co.
[2](deleted)
[3]Solution polymerized styrene butadiene rubber with 25 percent by weight styrene, 47 percent by weight vinyl and Tg = −25° C., extended with 37.5 phr TDAE oil.
[4]Solution polymerized styrene butadiene rubber with 40 percent by weight styrene, 24 percent by weight vinyl and Tg = −28° C., extended with 37.5 phr TDAE oil.
[5]Hydrated poly-(1-decene), reportedly with kinematic viscosity at 40 C. of 30 mm²/s and solidification point of −63 C., as Luxomaxx ® PAO 60 from Lehmann&Voss&Co.
[6]Styrene/alphamethylstyrene resin, as Resin 2336 from Eastman Chemical As seen in FIG. 4, in a homogeneous blend plasticizers and resins randomly distribute and the push-pull effect of polyalphaolefin and styrene-alphamethyl styrene resin observed in Example 1 is not seen and the Tan D temperature curve for the combination of polyalphaolefin and styrene-alphamethylstyrene resin (Sample 9) roughly coincides with the curve based on the blend with TDAE oil only (Sample 6). The slight Tan D peak differences among polyalphaolefine/styrene-alphamethylstyrene resin, Palm Oil/styrene-alphamethylstyrene resin and TDAE oil/styrene-alphamethylstyrene resin are the outcome of the respective Tg locations of polyalphaolefin, Palm Oil and TDAE oil. A slightly more beneficial G'/temperature slope at temperatures below −40° C. results with polyalphaolefin/styrene-alphamethylstyrene resin in such a homogeneous blend but the wet/winter compromise improvement remains small versus the heterogeneous blend shown in Example 1.

Example 3

In this example, the effect of first and second plasticizers on a heterogeneous high vinyl butadiene rubber and high styrene SBR blend is illustrated. Rubber compounds with recipes shown in Table 3 were prepared using a Werner Pfleiderer 3600 ml chamber applying the same mixing protocol as for Examples 1 and 2. Viscoelastic temperature response as measure by SMD 2000 are shown in FIGS. 5 and 6.

TABLE 3

| Sample No. | 1 | 10 | 11 |
|---|---|---|---|
| First Non-Productive Mix Stage | | | |
| Polybutadiene, cis[1] | 45 | 20 | 20 |
| ESBR, high styrene[2] | 0 | 27.51 | 27.51 |
| Polybutadiene, vinyl[7] | 0 | 20 | 20 |
| SSBR, med styrene[3] | 75.62 | 0 | 0 |
| Natural Rubber | 0 | 20 | 20 |
| SSBR, high styrene[4] | 0 | 27.51 | 27.51 |
| Polyalphaolefin[5] | 0 | 0 | 16.38 |
| Resin[6] | 0 | 0 | 10 |
| Antidegradant | 2.5 | 2.5 | 2.5 |
| TDAE oil | 19.375 | 23.38 | 0 |
| Stearic Acid | 3 | 3 | 3 |
| Silane | 6.56 | 6.56 | 6.56 |
| Silica | 105 | 105 | 105 |
| Second Non-Productive Mix Stage | | | |
| Carbon Black | 5 | 5 | 5 |
| Waxes | 1.5 | 1.5 | 1.5 |
| Productive Mix Stage | | | |
| Antidegradant | 0.5 | 0.5 | 0.5 |
| Zinc Oxide | 2.5 | 2.5 | 2.5 |
| Sulfur | 1.4 | 1.4 | 1.4 |
| Accelerators | 3.9 | 3.9 | 3.9 |

Figure 5:
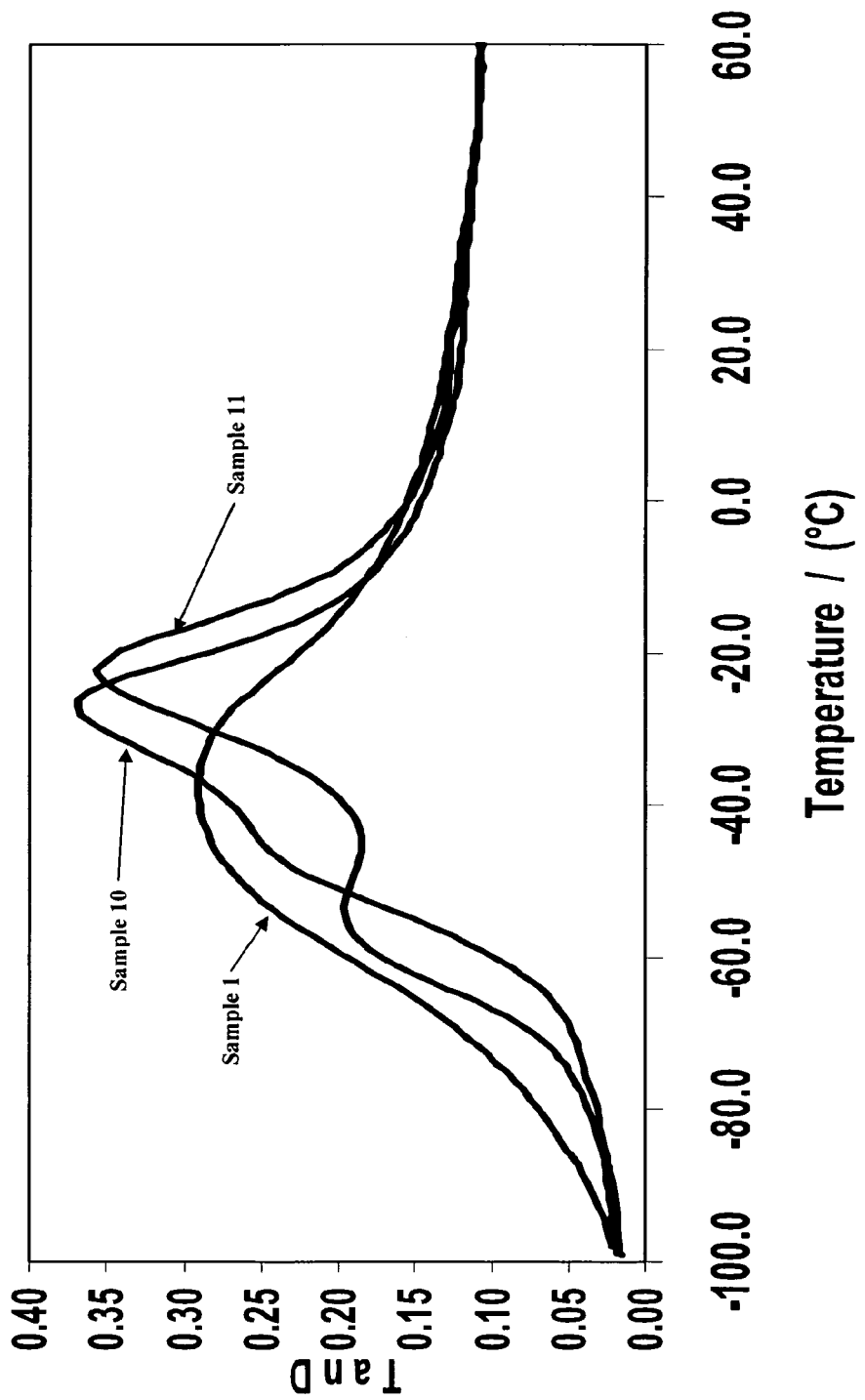
FIG. 5 shows a graph of tangent delta versus temperature for various heterogeneous rubber compounds.
Figure 6:
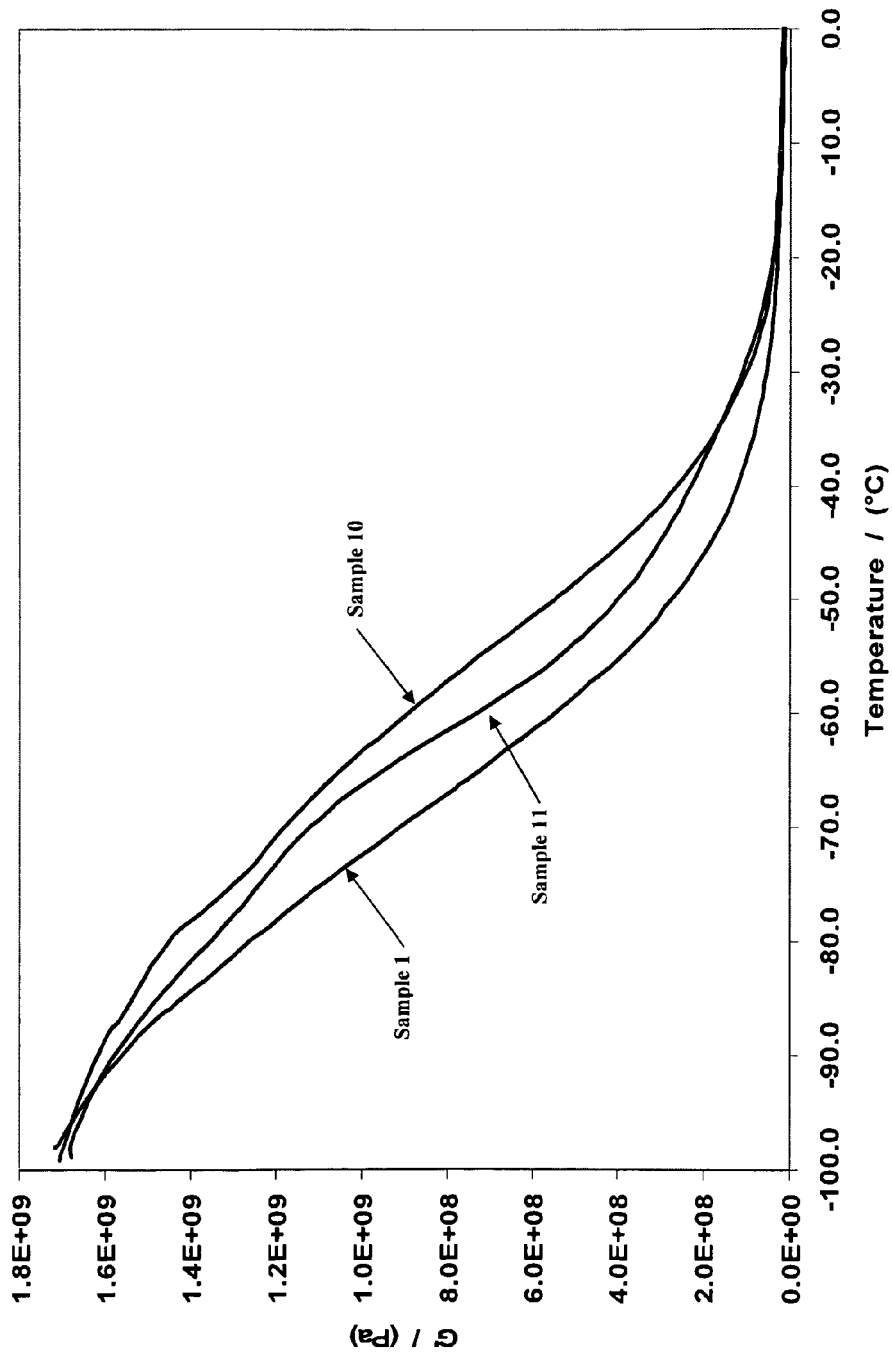
FIG. 6 shows a graph of storage modulus versus temperature for various heterogeneous rubber compounds.

[1]Polybutadiene with Tg = −104° C., as Budene 1207 from The Goodyear Tire & Rubber Co.
[2]Emulsion polymerized styrene butadiene rubber with 40 percent by weight styrene and Tg = −36° C., extended with 37.5 phr TDAE oil.
[3]Solution polymerized styrene butadiene rubber with 25 percent by weight styrene, 47 percent by weight vinyl and Tg = −25° C., extended with 37.5 phr TDAE oil.
[4]Solution polymerized styrene butadiene rubber with 40 percent by weight styrene, 24 percent by weight vinyl and Tg = 28° C., extended with 37.5 phr TDAE oil.
[5]Hydrated poly-(1-decene), reportedly with kinematic viscosity at 40 C. of 30 mm²/s and solidification point of −63° C., as Luxomaxx ® PAO 60 from Lehmann&Voss&Co.
[6]Styrene/alphamethylstyrene resin, as Resin 2336 from Eastman Chemical
[7]Polybutadiene with 80% by weight vinyl, Tg = 32° C., Mooney 70, from Polimeri SMD 2000 curves are displayed in FIGS. 5 and 6 for the compounds of Table 3. The favorable phase specific distribution of polyalphaolefin/styrene-alphamethylstyrene resin again translates in a clear push-pull effect with a favorable G' and Tan D balance indicative for winter and wet performance. Sample 10 with TDAE oil shows an indistinct peak at the lower temperature range centered at about −50° C., indicating an approximately even distribution of the TDAE oil in both elastomer phases. Sample 11 with the first and second plasticizers, eg polyalphaolefin and styrene/alphamethylstyrene resin, shows a distinct separation of the tan delta peaks and clear distribution of the plasticizers in the respective elastomer phases.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a ground contacting tread, the tread comprising a rubber composition comprising
   from 30 to 70 parts by weight, per 100 parts by weight of elastomer (phr), of a styrene-butadiene rubber having a bound styrene of at least 36 percent by weight;
   from 70 to 30 phr of a rubber selected from polybutadiene rubber and polyisoprene rubber;
   from 1 to 40 phr of a polyalphaolefin having a glass transition temperature Tg below −60° C.;
   from 1 to 20 phr of a resin derived from styrene and alphamethylstyrene having a glass transition temperature Tg ranging from 20° C. to 100° C.; and
   from 30 to 150 phr of silica;
   wherein the styrene-butadiene rubber is viscoelastically incompatible with the rubber selected from polybutadiene rubber and polyisoprene rubber.

2. The pneumatic tire of claim 1, wherein the polyalphaolefin is selected from the group consisting of polymers of butene, pentene, hexane, heptene, octene, nonene, decene, undodecene, and dodecene.

3. The pneumatic tire of claim 1, wherein the polyalphaolefin is a polymer of 1-decene.

4. A pneumatic tire comprising a ground contacting tread, the tread comprising a rubber composition comprising
   from 30 to 70 parts by weight, per 100 parts by weight of s first elastomer (phr) having a glass transition temperature Tg ranging from about −40° C. to about −10° C. and a solubility parameter ranging from about 4.1 $MPa^{1/2}$ to about 4.5 $MPa^{1/2}$;
   from 70 to 30 phr of a second elastomer having a Tg ranging from about −105° C. to about −30° C. and a solubility parameter ranging from about 3.7 $MPa^{1/2}$ to about 4.1 $MPa^{1/2}$;
   from 1 to 40 phr of a first plasticizer having a solubility parameter ranging from 3.4 $MPa^{1/2}$ to 3.8 $MPa^{1/2}$;
   from 1 to 20 phr of a second plasticizer having a solubility parameter ranging from 4.3 $MPa^{1/2}$ to 4.7 $MPa^{1/2}$; and
   from 30 to 150 phr of silica
   wherein the first elastomer is viscoelastically incompatible with the second elastomer.

5. The pneumatic tire of claim 4, wherein the first elastomer is a styrene-butadiene rubber having a bound styrene content of at least 36 percent by weight.

6. The pneumatic tire of claim 4, wherein the second elastomer is selected from polybutadiene and polyisoprene.

7. The pneumatic tire of claim 4, wherein the second plasticizer is a resin derived from styrene and alphamethylstyrene having a styrene/alphamethylstyrene ratio ranging from 0.4 to 1.5; a molecular weight ratio Mw/Mn ranging from 1.5 to 2.5, and a glass transition temperature Tg ranging from 30° C. to 100° C.

8. The pneumatic tire of claim 4, wherein the first plasticizer is a polyalphaolefin.

9. The pneumatic tire of claim 8, wherein the polyalphaolefin is selected from the group consisting of polymers of butene, pentene, hexane, heptene, octene, nonene, decene, undodecene, and dodecene.

10. The pneumatic tire of claim 8, wherein the polyalphaolefin is a polymer of 1-decene.

* * * * *